(12) United States Patent
Miyoshi et al.

(10) Patent No.: US 9,371,964 B2
(45) Date of Patent: Jun. 21, 2016

(54) HIGH PRESSURE GAS TANK AND MANUFACTURING METHOD OF HIGH PRESSURE GAS TANK

(75) Inventors: Shinji Miyoshi, Okazaki (JP); Kentaroh Hioki, Toyota (JP)

(73) Assignees: TOYOTA JIDOSHA KABUSHIKI KAISHA, Toyota-Shi (JP); NIPPON SOKEN, INC., Nishio (JP)

(*) Notice: Subject to any disclaimer, the term of this patent is extended or adjusted under 35 U.S.C. 154(b) by 0 days.

(21) Appl. No.: 14/128,840

(22) PCT Filed: Jun. 28, 2012

(86) PCT No.: PCT/IB2012/001284
§ 371 (c)(1),
(2), (4) Date: Dec. 23, 2013

(87) PCT Pub. No.: WO2013/001348
PCT Pub. Date: Jan. 3, 2013

(65) Prior Publication Data
US 2014/0131365 A1    May 15, 2014

(30) Foreign Application Priority Data
Jun. 29, 2011 (JP) ................. 2011-144366

(51) Int. Cl.
*F17C 1/16* (2006.01)
*F17C 1/06* (2006.01)
(Continued)

(52) U.S. Cl.
CPC ................ *F17C 1/16* (2013.01); *B29C 70/086* (2013.01); *B29C 70/32* (2013.01); *F17C 1/06* (2013.01);
(Continued)

(58) Field of Classification Search
CPC ................ F17C 1/00; F17C 1/02; F17C 1/04; F17C 1/06; F17C 2201/01; F17C 2203/00; F17C 2203/06; B29C 70/00; B29C 70/02; B29C 70/021; B29C 70/026; B29C 70/04; B29C 70/06; B29C 7/08; B29C 70/081; B29C 70/083; B29C 70/085; B29C 70/086; B29C 70/088; B29C 70/20; B29C 70/22; B29C 70/28; B29C 70/30; B29C 70/305; B29C 70/32; B29C 70/323; B29C 70/326; B29C 70/34; B29C 70/347; B29C 70/36
USPC ................ 220/89.1, 586, 587, 591, 745, 913, 220/4.12, 62.11, 62.21, 62.22, 581, 588
See application file for complete search history.

(56) References Cited

U.S. PATENT DOCUMENTS 3,604,587 A * 9/1971 Pechacek .................. 220/587
5,025,943 A   6/1991 Forsman
(Continued)

FOREIGN PATENT DOCUMENTS

DE          68921356 T2    11/1995
DE      102006043582 B3     3/2008
(Continued)

*Primary Examiner* — Steven A. Reynolds
*Assistant Examiner* — Javier A Pagan
(74) *Attorney, Agent, or Firm* — Kenyon & Kenyon LLP

(57) ABSTRACT

This high pressure gas tank is a tank in which a fiber-reinforced resin layer is formed around an outer periphery of a tank liner by fibers impregnated with thermosetting resin being wound around the outer periphery of the tank liner. The fiber-reinforced resin layer includes an inside layer formed on the tank liner side, and an outside layer formed on an outer periphery of the inside layer. The inside layer is formed as a dense layer, while the outside layer is formed as a layer that is less dense than the inside layer by forming a larger number of airspaces in the outside layer than there are in the inside layer.

8 Claims, 8 Drawing Sheets

(51) Int. Cl.
*B29C 70/32* (2006.01)
*B29C 70/08* (2006.01)

(52) U.S. Cl.
CPC ... *F17C 2203/0604* (2013.01); *F17C 2203/066* (2013.01); *F17C 2203/0607* (2013.01); *F17C 2203/0624* (2013.01); *F17C 2203/0663* (2013.01); *F17C 2209/2154* (2013.01)

(56) References Cited

U.S. PATENT DOCUMENTS 8,424,793 B2 * 4/2013 Aiyama .................. 242/438.1
8,727,174 B2 * 5/2014 Otsubo ........................ 220/589

2009/0236349 A1 9/2009 Mueller et al.

FOREIGN PATENT DOCUMENTS

| | | |
|---|---|---|
| JP | 2008-261414 A | 10/2008 |
| JP | 2009-012341 A | 1/2009 |
| JP | 2009-174700 A | 8/2009 |
| JP | 2009-191904 A | 8/2009 |
| JP | 2009-216133 A | 9/2009 |
| JP | 2009-222195 A | 10/2009 |
| JP | 2010-223243 A | 10/2010 |
| JP | 2011-025497 A | 2/2011 |
| JP | 2011-144860 A | 7/2011 |
| JP | 2012-042032 A | 3/2012 |

* cited by examiner

HIGH PRESSURE GAS TANK AND MANUFACTURING METHOD OF HIGH PRESSURE GAS TANK

CROSS REFERENCE TO RELATED APPLICATION

This is a national phase application based on the PCT International Patent Application No. PCT/IB2012/001284 filed on Jun. 28, 2012, claiming priority to Japanese application No. 2011-144366 filed Jun. 29, 2011, the entire contents of both of which are incorporated herein by reference.

BACKGROUND OF THE INVENTION

1. Field of the Invention

The invention relates to a high pressure gas tank, and more particularly, to a high pressure gas tank having a structure in which an outer periphery of a tank liner is covered by a fiber-reinforced resin layer.

2. Description of Related Art

An outer periphery of a tank liner of a high pressure gas tank is covered with fiber-reinforced resin. Japanese Patent Application Publication No. 2009-216133 (JP 2009-216133 A) describes technology in which gas venting holes are formed in fiber-reinforced resin in order to prevent residual gas that has permeated the tank liner and is trapped between the tank liner and the fiber-reinforced resin from being released outside all at once with release noise.

Moreover, Japanese Patent Application Publication No. 2009-191904 (JP 2009-191904 A) describes technology that inhibits the production of release noise of residual gas by melting a thermoset resin layer formed on an outermost peripheral portion of a fiber-reinforced resin layer to make it easier for the residual gas to pass through the thermoset resin layer.

A gas venting hole forming method described in Japanese Patent Application Publication No. 2009-216133 (JP 2009-216133 A) involves forming gas venting holes in a fiber-reinforced resin layer by producing minute cracks by injecting gas of equal to or greater than regular pressure between the tank liner and the fiber-reinforced resin layer. However, with this method, it is difficult to control the positions where the minute cracks are produced, so it is difficult to form gas venting holes evenly over the entire fiber-reinforced resin layer. If there is an area where no gas venting hole is formed in a portion of the fiber-reinforced resin layer, gas release noise will be produced in this area. Therefore, an attempt to inhibit gas release noise would require a separate process for inspecting the distribution of gas venting holes and selecting a tank in which the gas venting holes are distributed appropriately, which would increase both time and cost related to manufacturing.

Also, a manufacturing method described in JP 2009-191904 A involves using a solvent to melt a thermoset resin layer formed on an outermost peripheral portion of a fiber-reinforced resin layer. With this manufacturing method, it is difficult to form the thickness of the final thermoset resin layer evenly. Therefore, residual gas may end up being trapped locally in a portion where the thermoset resin layer is thickly formed, and as a result, a phenomenon in which residual gas ends up being released outside all at once with release noise is not able to be completely prevented.

Moreover, if a large amount of gas that will pass through the tank liner to the outside is generated locally, it will exceed the allowable limit of gas that is able to permeate the thermoset resin layer, so release noise at this portion is unable to be prevented.

SUMMARY OF THE INVENTION

The invention thus provides a high pressure gas tank capable of inhibiting gas release noise caused by gas that has passed through a tank liner, as well as a manufacturing method of this high pressure gas tank.

A first aspect of the invention relates to a high pressure gas tank in which a fiber-reinforced resin layer is formed on an outer periphery of a tank liner by fibers impregnated with thermosetting resin being wound around the outer periphery of the tank liner. The fiber-reinforced resin layer includes an inside layer formed on the tank liner side, and an outside layer formed on an outer periphery of the inside layer. The inside layer is formed as a dense layer, while the outside layer is formed as a layer that is less dense than the inside layer.

According to this aspect, the fiber-reinforced resin layer is formed divided into an inside layer and an outside layer. Therefore, the function of the overall fiber-reinforced resin layer is able to be increased by having the characteristics of these layers be different from one another. More specifically, forming the inside layer as a dense layer enables strength that can withstand a large force applied from the tank liner side to be ensured. Even if the inside layer is densely formed in this way, gas stored inside of the tank liner is at a high pressure, so the gas passes through the inside layer to the outside layer. Therefore, by making the outside layer be a layer that is less dense than the inside layer, the gas that has passed through is dispersed throughout the entire outside layer that has a low density. In order to make the outside layer a layer that is less dense than the inside layer, a large number of airspaces may be formed in the outside layer, for example. By providing a large number of airspaces in the outside layer in this way, the gas that has passed through moves between the large number of airspaces and is dispersed throughout the entire outside layer. Dispersing the gas throughout the entire outside layer in this way enables localized gas release to be reduced, which in turn makes it possible to sufficiently suppress gas release noise.

Furthermore, even if gas that passes through the tank liner to the outside is generated in large quantities locally, the density of the outside layer of the fiber-reinforced resin layer is low, so gas will not concentrate in one area, but will instead reach the surface resin layer after dispersing. As a result, gas permeates the surface resin layer and flows out of the high pressure gas tank, so the production of gas release noise is able to be reliably suppressed.

In the aspect described above, a thickness of the outside layer may be formed thinner than a thickness of the inside layer.

As described above, the inside layer mainly serves to ensure strength, and the outside layer mainly serves to disperse gas that has passed through from the inside layer side. With this structure, the thickness of the inside layer is able to be ensured, and thus sufficient strength is able to be ensured, by making the thickness of the outside layer thinner than the thickness of the inside layer.

In the aspect described above, airspaces may be formed in the outside layer, and no airspaces may be formed in the inside layer.

A second aspect of the invention relates to a manufacturing method of a high pressure gas tank in which a fiber-reinforced resin layer is formed on an outer periphery of a tank liner by fibers impregnated with thermosetting resin being wound around the outer periphery of the tank liner. This manufacturing method includes a preparing process for preparing the tank liner, a first forming process for forming an inside uncured layer on the tank liner by winding the fibers on the tank liner, a second forming process for forming an outside uncured layer on the inside uncured layer by winding the fibers on the inside uncured layer, and a hardening process for hardening the thermosetting resin of the inside uncured layer and the outside uncured layer by heating to form the inside layer and the outside layer, respectively, and thus forming the fiber-reinforced resin layer. The inside uncured layer is densely formed in the first forming process. The inside layer is made to be a dense layer, while the outside layer is made to be a layer that is less dense than the inside layer by forming a large number of airspaces in the outside uncured layer in the second forming process.

According to this aspect, varying the way in which the inside uncured layer is formed in the first forming process from the way in which the outside uncured layer is formed in the second forming process results in the formation of a fiber-reinforced resin layer having an inside layer and an outside layer with different characteristics. In this way, a fiber-reinforced resin layer formed on the outside of the tank liner is formed divided into an inside layer and an outside layer, so it is extremely easy to make the characteristics of these layers different, and as a result, it is easy to increase the function of the overall fiber-reinforced resin layer. More specifically, forming the inside layer as a dense layer makes it possible to ensure strength that can withstand a large force applied from the tank liner side. Even if the inside layer is densely formed in this way, gas that is stored inside the tank liner is at a high pressure, so the gas passes from the inside layer to the outside layer. Therefore, in this invention, gas that has passed through is dispersed throughout the entire outside layer that has a low density, by forming the outside layer as a layer that is less dense than the inside layer. In order to make the outside layer a layer that is less dense than the inside layer, a large number of airspaces may be formed in the outside layer, for example. By providing a large number of airspaces in the outside layer in this way, gas that has passed through moves between the large number of airspaces and is dispersed throughout the entire outside layer. Dispersing the gas throughout the entire outside layer in this way enables localized gas release to be reduced, which in turn makes it possible to sufficiently suppress gas release noise.

Also, in the aspect described above, in the second forming process, a thickness of the outside layer may be formed thinner than the thickness of the inside layer by forming the outside uncured layer with a smaller number of windings of the fibers than the number of windings of the fiber in the first forming process.

In this structure, the inside layer mainly serves to ensure strength, and the outside layer mainly serves to disperse the gas that has passed through from the inside layer side. With this structure, the thickness of the outside layer may be formed thinner than the thickness of the inside layer by making the number of windings of the outside uncured layer smaller than the number of windings of the inside uncured layer. Accordingly, the thickness of the inside layer can be ensured, so sufficient strength is able to be ensured, by simply changing the number of windings.

Also, in the structure described above, in the second forming process, the large number of airspaces may be formed in the outside layer by making a winding tension of the fibers lower than the winding tension of the fibers in the first forming process.

When the winding tension of the fibers is reduced, slack occurs in that winding portion, and airspaces are reliably created from this slack. In the structure described above, the large number of airspaces is easily and reliably formed in the outside layer by making the winding tension of the fibers in the second forming process lower than the winding tension of the fibers in the first forming process.

Also, in the structure described above, the winding tension of the fibers in the second forming process may be equal to or less than ½ of the winding tension of the fibers in the first forming process.

Also, in the structure described above, in the second forming process, the large number of airspaces may be formed in the outside layer by making a winding direction of the fibers different than the winding direction of the fibers in the first forming process.

Also, in the structure described above, the winding direction of the fibers in the first forming process may be substantially perpendicular to an axis of the tank liner, and the winding direction of the fibers in the second forming process may be at a slight angle with respect to the axis of the tank liner.

Also, in the structure described above, the first forming process may include a hoop winding, and the second forming process may include a helical winding.

In this structure, a helical winding wound at a slight angle with respect to the axis of the tank liner, for example, may be employed by making the winding direction of the fibers in the second forming process different from the winding direction of the fibers in the first forming process. Employing a helical winding when forming the outside uncured layer in this way, enables airspaces to be created at the side end portions of the fibers.

Also, in the structure described above, in the second forming process, the large number of airspaces may be formed in the outside layer by interposing gap material between the fibers.

Also, in the structure described above, the gap material may be formed by glass fiber.

In this structure, in the second forming process, a large number of airspaces are able to be reliably formed in the outside layer by adding gap material such as glass fibers when winding the fibers, for example.

According to the aspects and structures described above, a high pressure gas tank capable of inhibiting gas release noise caused by gas that has permeated a tank liner, as well as a manufacturing method of this high pressure gas tank, are able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
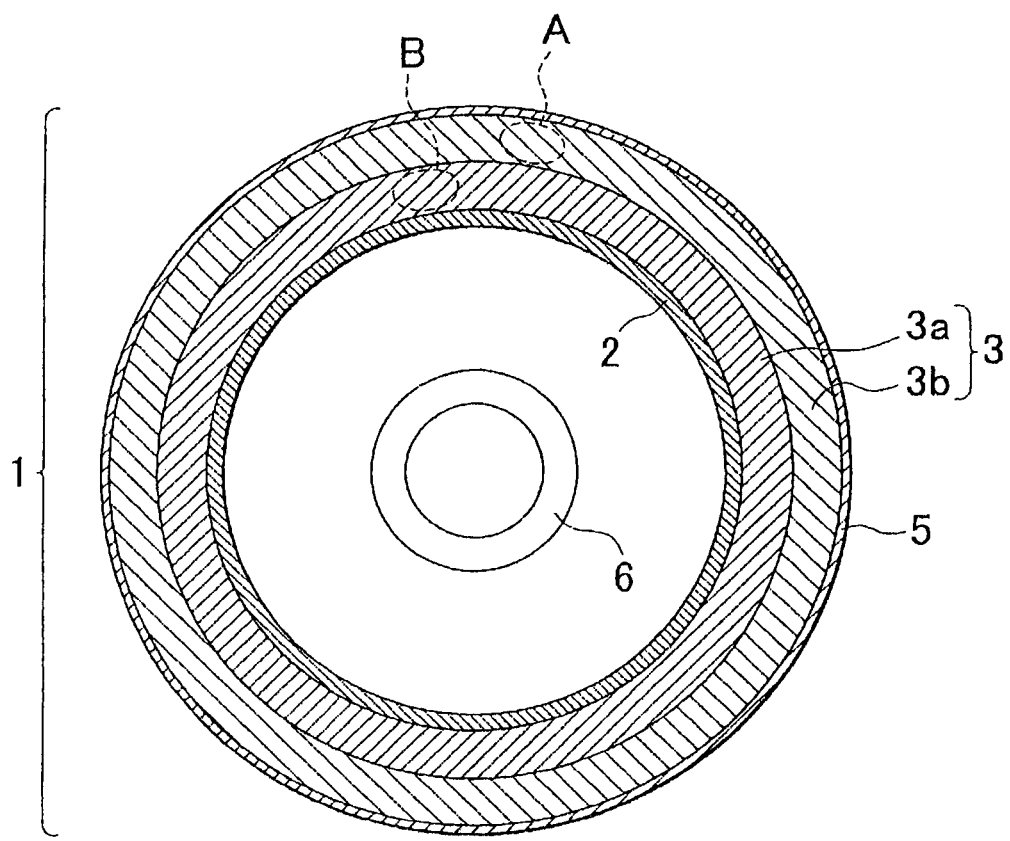
FIG. 1 is a sectional view of a high pressure gas tank according to an example embodiment of the invention.

Hereinafter, example embodiments of the invention will be described with reference to the accompanying drawings. To facilitate understanding of the description, like constituent elements in the drawings will be denoted, as much as possible, by like reference characters, and redundant descriptions of those elements will be omitted.

First, a high pressure gas tank according to an example embodiment of the invention will be described with reference to FIG. 1. FIG. 1 is a sectional view of a high pressure gas tank 1 according to this example embodiment. FIG. 1 shows a cross section on a plane orthogonal to the axial direction (i.e., the longitudinal direction) of the high pressure gas tank 1, through an area near the center of the high pressure gas tank 1.

As shown in FIG. 1, the high pressure gas tank 1 includes a tank liner 2, a fiber-reinforced resin layer 3, a surface resin layer 5, and a cap 6. The tank liner 2 is arranged farthest to the inside, and is a cylindrical member with both ends closed so that gas such as hydrogen gas can be kept inside.

The cap 6 is attached to one end portion in the longitudinal direction of the tank liner 2, and serves as an inlet through which gas is introduced into the tank liner 2. More specifically, the cap 6 has a generally cylindrical shape, and is a metal part that fits into an opening in the tank liner 2. The cap 6 is used to provide a connection with an external gas supply line when supplying hydrogen inside of the high pressure gas tank 1 to outside the tank.

The fiber-reinforced resin layer 3 is a layer formed by winding fiber around the outer periphery of the tank liner 2. The fiber-reinforced resin layer 3 includes an inside layer 3a and an outside layer 3b. The inside layer 3a is formed as a dense layer that is adjacent to the outer periphery of the tank liner 2. On the other hand, the outside layer 3b is formed as a low-density layer that has a large number of airspaces in it and is adjacent to the outer peripheral side of the inside layer 3a.

The surface resin layer 5 is formed as a layer of only resin that does not include fibers, on the outermost periphery of the fiber-reinforced resin layer 3.

Figure 2:
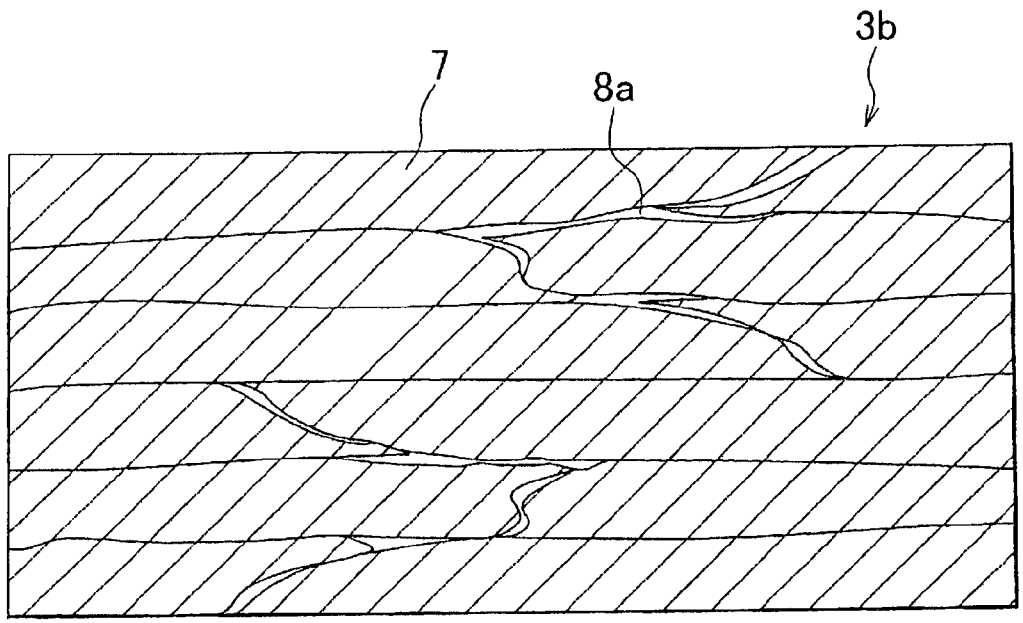
FIG. 2 is an enlarged sectional view of the structure of portion A in FIG. 1.
Figure 3:
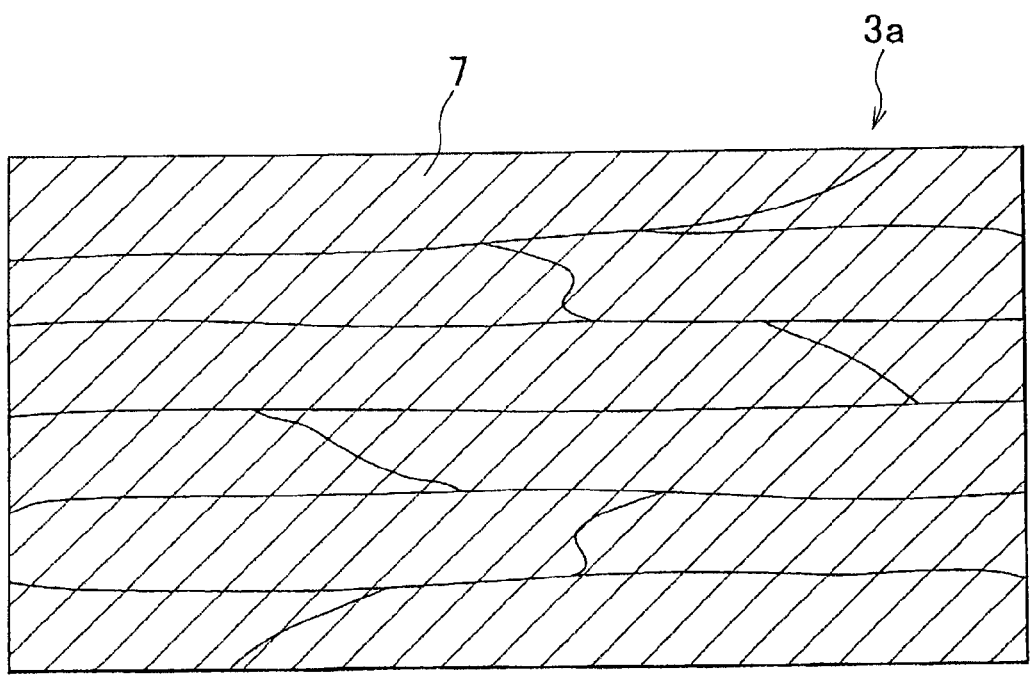
FIG. 3 is an enlarged sectional view of the structure of portion B in FIG. 1.

Continuing on, the inside layer 3a and the outside layer 3b that form the fiber-reinforced resin layer 3 will be described with reference to FIGS. 2 and 3. FIG. 2 is an enlarged sectional view of the structure of portion A in FIG. 1, and shows the outside layer 3b in detail. FIG. 3 is an enlarged sectional view of the structure of portion B in FIG. 1, and shows the inside layer 3a in detail.

As shown in FIG. 2, the outside layer 3b is formed as an overall CFRP (Carbon Fiber Reinforced Plastic) structure, in which carbon fibers 7 are stacked on top of one another and adjacent carbon fibers 7 are bound together with epoxy resin, not shown.

In the outside layer 3b, airspaces 8a are formed between the carbon fibers 7 (including the epoxy resin that binds the carbon fibers 7 together; hereinafter the same). A large number of these airspaces 8a are formed all over throughout the entire outside layer 3b. Thus, the outside layer 3b is a layer that has a large number of airspaces 8a in it.

Meanwhile, as shown in FIG. 3, the inside layer 3a is also an overall CFRP structure, in which carbon fibers 7 are stacked on top of one another and adjacent carbon fibers 7 are bound together with epoxy resin, not shown.

However, in the inside layer 3a, airspaces are not formed between the carbon fibers 7. Instead, the carbon fibers 7 are tightly connected together. Thus, the inside layer 3a is formed as a dense layer with almost no airspaces in it.

As described above, in this example embodiment, the fiber-reinforced resin layer 3 that is formed on the outside of the tank liner 2 is formed divided into the inside layer 3a and the outside layer 3b. Therefore, the function of the overall fiber-reinforced resin layer 3 is increased by having the characteristics of these layers be different from one another. More specifically, forming the inside layer 3a as a dense layer enables strength that can withstand a large force applied from the tank liner 2 side to be ensured. Even when the inside layer 3a is densely formed in this way, gas stored inside of the tank liner 2 is at a high pressure, so gas passes through the inside layer 3a to the outside layer 3b. Therefore, by making the outside layer 3b a low-density layer by forming more airspaces 8a in the outside layer 3b than there are in the inside layer 3a, the gas that has passed through moves between the large number of airspaces 8a so that it is dispersed throughout the entire outside layer 3b. Dispersing gas throughout the entire outside layer 3b in this way makes it possible to reduce localized gas release, thus enabling gas release noise to be sufficiently suppressed.

Furthermore, even if gas that passes through the tank liner 2 to the outside is generated in large quantities locally, the density of the outside layer 3b is low due to the large number of airspaces 8a distributed throughout the outside layer 3b of the fiber-reinforced resin layer 3, so gas will not concentrate in one area, but will instead reach the surface resin layer 5 after dispersing following the distribution of airspaces 8a. As a result, gas permeates the surface resin layer 5 and flows out of the high pressure gas tank, so the production of gas release noise is able to be reliably suppressed.

Also, in this example embodiment, the thickness of the outside layer 3b is formed thinner than the thickness of the inside layer 3a. As described above, in this example embodiment, the inside layer 3a mainly serves to ensure strength, and the outside layer 3b mainly serves to disperse gas that has passed through from the inside layer 3a side. Therefore, making the thickness of the outside layer 3b thinner than the thickness of the inside layer 3a ensures the thickness of the inside layer 3a, and thus makes it possible to ensure sufficient strength.

Figure 4:
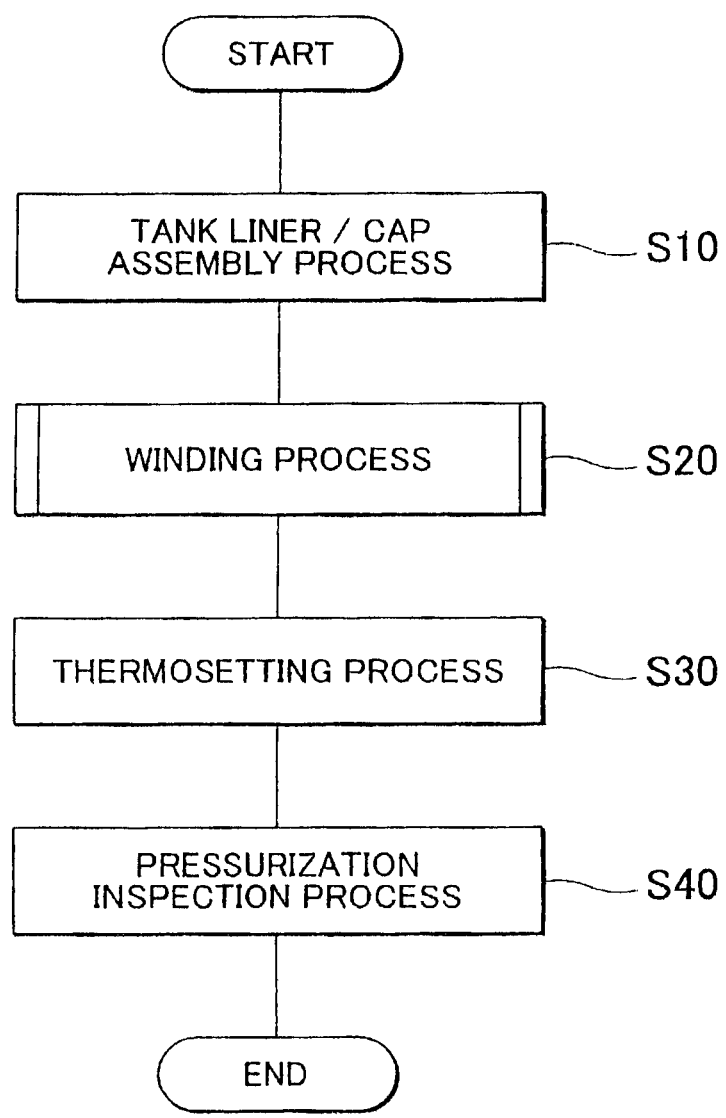
FIG. 4 is a flowchart illustrating a manufacturing process of the high pressure gas tank according to the example embodiment.

Continuing on, a manufacturing method of the high pressure gas tank 1 according to this example embodiment will now be described. FIG. 4 is a flowchart illustrating a manufacturing method of the high pressure gas tank 1 according to this example embodiment. As shown in FIG. 4, the manufacturing method of the high pressure gas tank 1 includes a tank liner/cap assembly process S10, a winding process S20, a thermosetting process S30, and a pressurization inspection process S40.

In the tank liner/cap assembly process S10, the cap 6 is assembled to the tank liner 2 as part of a preparation process. In this case, the cap 6 is not a specific cap; a typical cap may be used.

In the winding process S20 following the tank liner/cap assembly process S10, an uncured fiber-reinforced resin layer that will become the fiber-reinforced resin layer 3 is formed by winding CFRP prepreg (made by impregnating carbon fibers with epoxy resin and semi-curing the epoxy resin; is ribbon-shaped) around the outer surface of the tank liner 2, and thermosetting (i.e., thermally curing) it.

Figure 5:
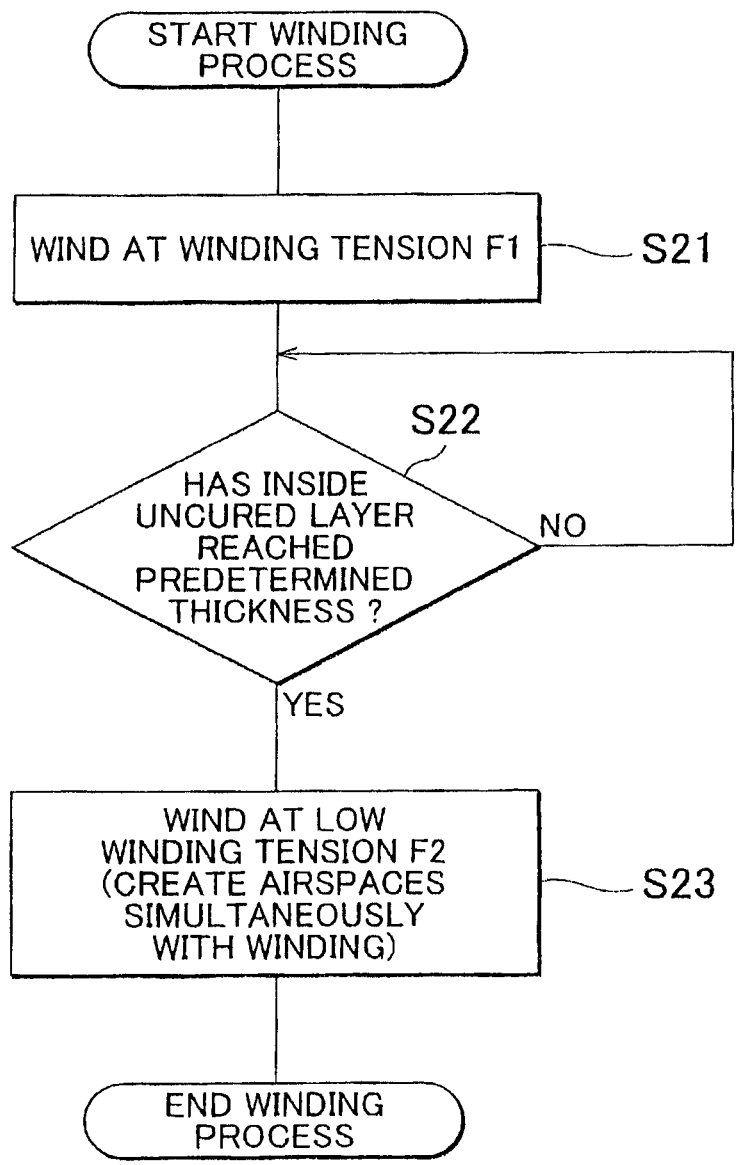
FIG. 5 is a flowchart illustrating the details of a winding process according to the example embodiment.

Next, the winding process S20 will be described in detail with reference to FIG. 5. FIG. 5 is a flowchart illustrating the detailed steps of the winding process S20. First, in step S21 (a first forming process), an inside uncured layer that will become the inside layer 3a is formed by thermosetting. More specifically, the CFRP prepreg is wound at a winding tension F1 around the outer surface of the tank liner 2 by a filament winding method.

The predetermined winding tension F1 at this time may be approximately 60 N, for example. When wound at approximately this tension, the CFRP prepreg is able to be wound with no slack, thus inhibiting the creation of airspaces caused by slack. The winding tension F1 when forming the inside uncured layer is not limited to always being constant, and may be changed appropriately according to the number of windings, within a range that has the predetermined winding tension as the center or a lower limit.

The winding direction of the CFRP prepreg may be that of a so-called hoop winding in a direction substantially perpendicular to an axis of the tank liner 2. A hoop winding makes it possible to suppress a phenomenon in which airspaces are created at side end portions of the CFRP prepreg.

In step S22 following step S21, it is determined whether the thickness of the inside uncured layer has reached a predetermined thickness. If the thickness of the inside uncured layer has not reached the predetermined thickness, winding is continued, and the determination in step S22 continues to be made. If the thickness of the inside uncured layer has reached the predetermined thickness, the process proceeds on to step S23. The predetermined thickness is a thickness required to provide strength that is able to withstand the internal pressure when the high pressure gas tank 1 is used, and may be set appropriately.

In step S23 (a second forming process), the CFRP prepreg continues to be wound at a winding tension F2 that is lower than the winding tension F1 in step S21. Just as with the formation of the inside uncured layer, an outside uncured layer is formed by winding the CFRP prepreg by the filament winding method. The winding tension at this time is the winding tension F2 that is lower than the winding tension F1 when forming the inside uncured layer. The outside uncured layer is formed while maintaining this winding tension F2.

The predetermined winding tension F2 when forming the outside uncured layer may be equal to or less than ½ of the winding tension F1, e.g., approximately 30 N. Forming the outside uncured layer while the winding tension F2 is set low in this way allows airspaces (i.e., airspaces that can become the airspaces 8a after thermosetting) to form simultaneously with the winding. Therefore, at the point when the outside uncured layer is finished being formed, airspaces positively exist in the entire outside uncured layer, so the outside uncured layer has a low density.

Just as with the winding tension F1 when forming the inside uncured layer, the winding tension F2 when forming the outside uncured layer is not limited to always being constant. The winding tension F2 when forming the outside uncured layer may also be changed appropriately according to the number of windings, within a range that has the predetermined winding tension as the center or a lower limit.

In this example embodiment, in the second forming process (i.e., step S23), the number of windings of the CFRP prepreg is less than the number of windings in the first forming process (i.e., step S21). Therefore, the thickness of the outside uncured layer is formed thinner than the thickness of the inside uncured layer, and after hardening, the thickness of the outside layer 3b is formed thinner than the thickness of the inside layer 3a.

The description will continue returning to FIG. 4. In the thermosetting process S30 following the winding process S20, thermosetting resin of the uncured layers is hardened by heating, thus forming the fiber-reinforced resin layer 3. As described above, at the point when the winding process S20 is complete, the outer periphery of the tank liner 2 is covered by two layers, i.e., an inside uncured layer inside of which there are almost no airspaces due to winding being performed at a relatively strong winding tension, and an outside uncured layer inside of which there are a large number of airspaces throughout due to winding being performed at a relatively weak winding tension.

In this state, after, the thermosetting process S30 in which the thermoset resin is hardened by heating the entire body, the thermosetting resin of the inside uncured layer and the outside uncured layer are hardened while the large number of airspaces are present only in the outside uncured layer, thus yielding the inside layer 3a and the outside layer 3b. The fiber-reinforced resin layer 3 is formed in this way.

In the pressurization inspection process S40 following the thermosetting process S30, a pressurization inspection is performed to check whether the high pressure gas tank 1 has a predetermined strength. A large number of airspaces are already formed in the outside layer 3b, so there is no need to form airspaces again in this pressurization inspection process, so a normal pressurization inspection can be performed.

With the manufacturing method of the high pressure gas tank 1 according to this example embodiment, in the second forming process (i.e., in step S21 in FIG. 5), a large number of airspaces are formed in the outside layer 3b by reducing the winding tension of the fibers (CFRP prepreg) from that in the first forming process (i.e., step S23 in FIG. 5).

More specifically, in the inside uncured layer, the CFRP prepreg is wound at a high winding tension F1, so gaps created at the boundaries where the CFRP prepreg contacts itself are filled in by the deformation of the CFRP prepreg. As a result, no airspaces remain.

In contrast, in the outside uncured layer, the CFRP prepreg is wound at a weak winding tension F2 that is equal to or less than ½ of the winding tension F1, so there is little deformation of the CFRP prepreg. Therefore, the gaps created at the boundaries where the CFRP prepreg contacts itself are not filled in, but instead remain as airspaces.

In this way, when the winding force of the CFRP prepreg is low, there is slack in the wound portion, and airspaces are reliably created by this slack. Therefore, the winding tension of the fiber in the second forming process (i.e., step S21 in FIG. 5) is lower than that in the first forming process (i.e., step S23 in FIG. 5), so a large number of airspaces 8a are easily and reliably formed in the outside layer 3b.

In this example embodiment, an example is described in which the winding tension of the inside layer 3a is made different from that of the outside layer 3b, as a method for forming the inside layer 3a as a dense layer, while forming a larger number of airspaces in the outside layer 3b than there are in the inside layer 3a. However, a large number of airspaces are also able to be formed in the outside layer 3b not only by making the winding tensions different, but also by making the winding directions different. Hereinafter, an example in which the winding directions are made different will be described as a modified example.

Figure 6:
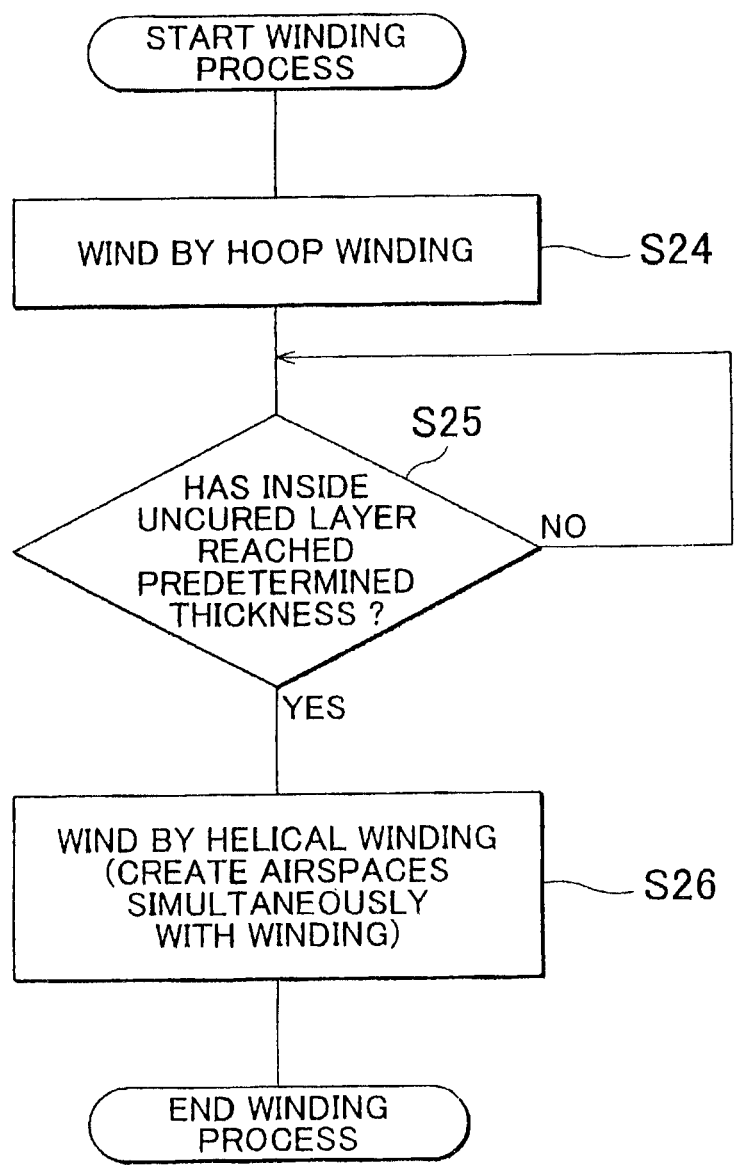
FIG. 6 is a flowchart illustrating a modified example of the winding process according to the example embodiment.

FIG. 6 is a flowchart illustrating the details of a winding process (that corresponds to the winding process S20 shown in FIG. 4) of the modified example. In this example, only the content of the winding process differs from the example embodiment described above; the rest is the same as it is in the example embodiment described above.

First, in step S24 (a first forming process), an inside uncured layer that will become the inside layer 3a is formed by thermosetting. More specifically, the CFRP prepreg is wound around the outer surface of the tank liner 2 at the winding tension F1 by the filament winding method. The winding direction of the CFRP prepreg in this case is that of a so-called hoop winding in direction that is substantially perpendicular to the axis of the tank liner 2. A hoop winding makes it possible to suppress a phenomenon in which airspaces are created at side end portions of the CFRP prepreg.

The predetermined winding tension F1 at this time may be approximately 60 N, for example. When wound at approximately this tension, the CFRP prepreg is able to be wound with no slack, thus inhibiting the creation of airspaces caused by slack. The winding tension F1 when forming the inside uncured layer is not limited to always being constant, and may be changed appropriately according to the number of windings, within a range that has the predetermined winding tension as the center or a lower limit.

In step S25 following step S24, it is determined whether the thickness of the inside uncured layer has reached a predetermined thickness. If the thickness of the inside uncured layer has not reached the predetermined thickness, winding is continued, and the determination in step S25 continues to be made. If the thickness of the inside uncured layer has reached the predetermined thickness, the process proceeds on to step S26. The predetermined thickness is a thickness required to provide strength that is able to withstand the internal pressure when the high pressure gas tank 1 is used, and may be set appropriately.

In step S26 (a second forming process), the CFRP prepreg continues to be wound at a tension that is equivalent to the winding tension F1 in step S21. In step S26, the winding direction is changed from that of a hoop winding that winds in a direction substantially perpendicular to the axis of the tank liner 2, to that of a helical winding that winds at a slight angle with respect to the axis of the tank liner 2.

Making the winding direction when forming the outside uncured layer that of a helical winding in this way facilitates the formation of gaps at the side end portions of the CFRP prepreg when the CFRP prepreg is overlapped with itself. Therefore, even if winding is performed while maintaining strong winding tension, the gaps will not disappear, but will remain as airspaces.

Figure 7:
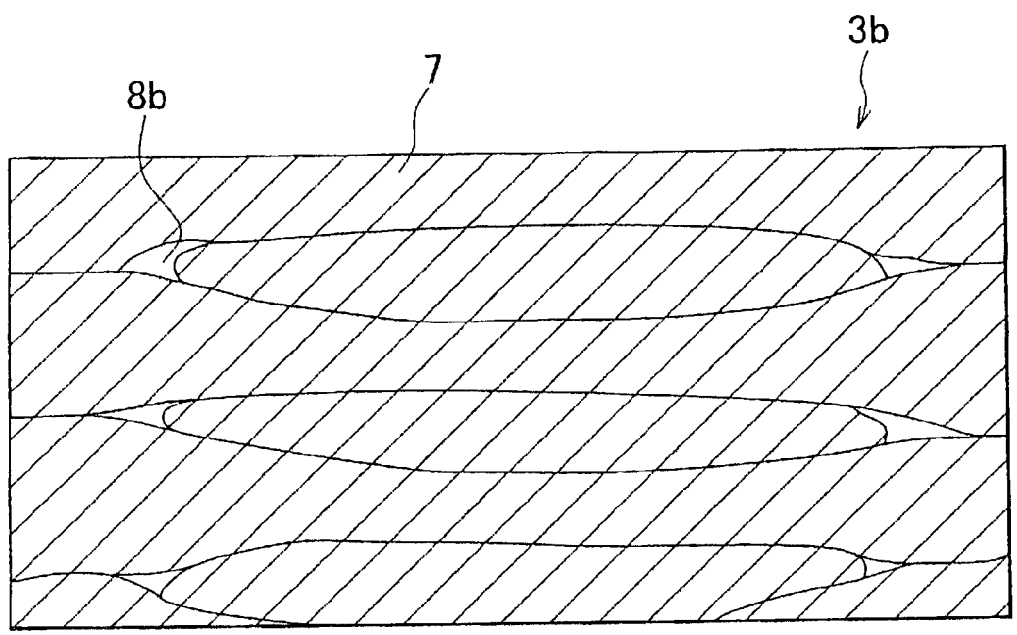
FIG. 7 is a sectional view of the structure of an outside layer, when formed by the winding process according to the modified example shown in FIG. 6.

FIG. 7 is a sectional view of the structure of the outside layer 3b of a high pressure gas tank formed by the winding process described with reference to FIG. 6. In the outside layer 3b, the winding direction is that of a helical winding, so when the carbon fibers 7 overlap with each other, gaps tend to form at the side end portions of the carbon fibers 7 and remain there, thus forming airspaces 8b.

Continuing on, an example in which a large number of airspaces are formed in the outside layer 3b by using gap material, instead of by winding tension, will be described as another modified example.

Figure 8:
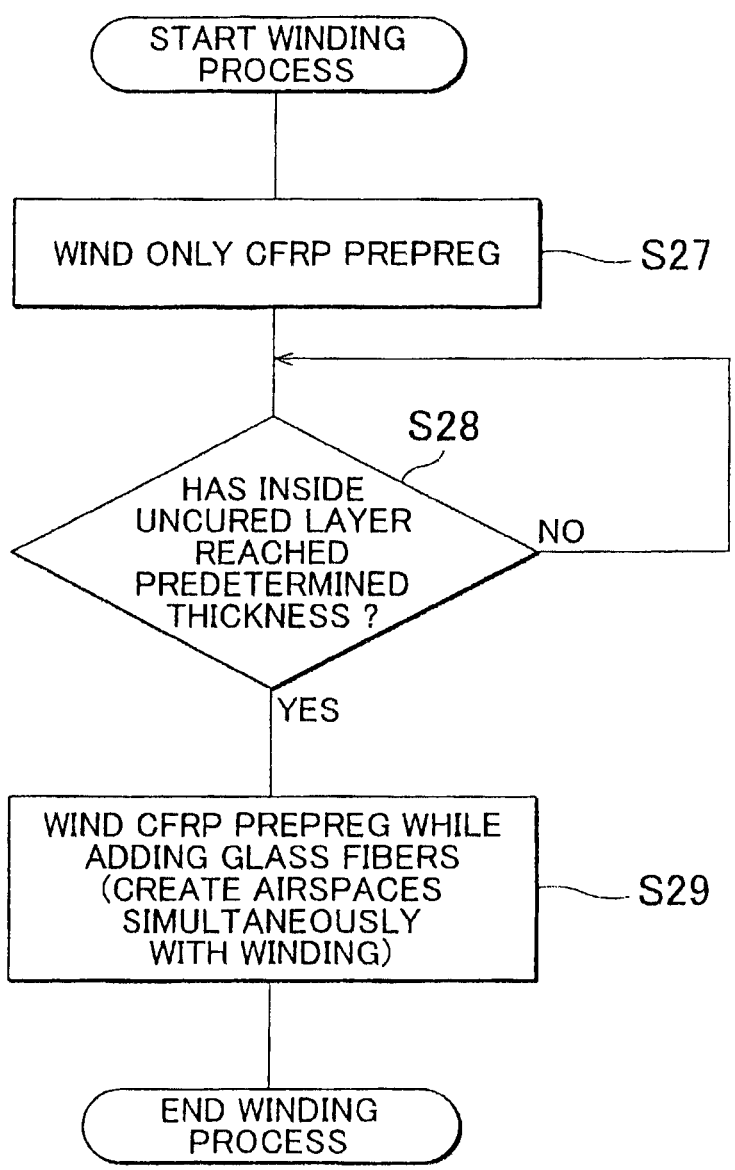
FIG. 8 is a flowchart illustrating another modified example of the winding process according to the example embodiment.

FIG. 8 is a flowchart illustrating the details of a winding process (that corresponds to winding process S20 in FIG. 4) according this modified example. In this example, only the content of the winding process differs from the example embodiment described above; the rest is the same as it is in the example embodiment described above.

First, in step S27 (a first forming process), an inside uncured layer that will become the inside layer 3a is formed by thermosetting. More specifically, CFRP prepreg is wound around the outer surface of the tank liner 2 at the winding tension F1 by the filament winding method. The winding direction of the CFRP prepreg in this case is that of a so-called hoop winding in a direction that is substantially perpendicular to the axis of the tank liner 2. A hoop winding makes it possible to suppress a phenomenon in which airspaces are created at side end portions of the CFRP prepreg.

The predetermined winding tension F1 at this time may be approximately 60 N, for example. When wound at approximately this tension, the CFRP prepreg is able to be wound with no slack, thus inhibiting the creation of airspaces caused by slack. The winding tension F1 when forming the inside uncured layer is not limited to always being constant, and may be changed appropriately according to the number of windings, within a range that has the predetermined winding tension as the center or a lower limit.

In step S28 following step S27, it is determined whether the thickness of the inside uncured layer has reached a predetermined thickness. If the thickness of the inside uncured layer has not reached the predetermined thickness, winding is continued, and the determination in step S28 continues to be made. If the thickness of the inside uncured layer has reached the predetermined thickness, the process proceeds on to step S29. The predetermined thickness is a thickness required to provide strength that is able to withstand the internal pressure when the high pressure gas tank 1 is used, and may be set appropriately.

In step S29 (a second forming process), the CFRP prepreg continues to be wound at a tension that is equivalent to the winding tension F1 in step S21. In step S29, the outside uncured layer is formed while adding glass fibers 9 as gap material, when winding the CFRP prepreg.

Adding glass fibers 9 as gap material when forming the outside uncured layer facilitates the formation of gaps near the glass fibers 9 when the CFRP prepreg is overlapped with itself. Therefore, even if winding is performed while maintaining strong winding tension, the gaps will not disappear, but will remain as airspaces.

Figure 9:
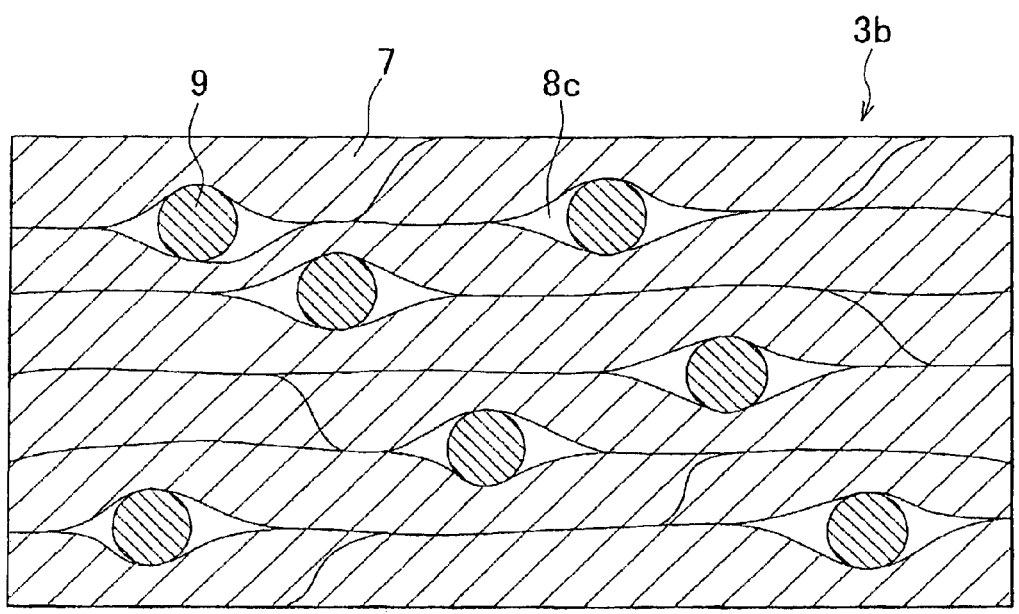
FIG. 9 is a sectional view of the structure of an outside layer, when formed by the winding process according to the modified example shown in FIG. 8.

FIG. 9 is a sectional view of the structure of the outside layer 3b of a high pressure gas tank formed by the winding process described with reference to FIG. 8. In the outside layer 3b, glass fibers are added as gap material, so when the carbon fibers 7 overlap with each other, gaps tend to form at the side end portions of the carbon fibers 7 and remain there, thus forming airspaces 8c.

In the example embodiment and modified examples thereof described above, a large number of airspaces are formed in the outside uncured layer by varying one of the winding tension, the winding direction, and the presence/absence of gap material in the second forming process. However, the invention is not limited to this. For example, a plurality of the winding tension, the winding direction, and the presence/absence of gap material in the second forming process may also varied simultaneously from what they are in the first forming process.

The invention claimed is:

1. A high pressure gas tank comprising:
   a tank liner; and
   a fiber-reinforced resin layer formed on an outer periphery of the tank liner by fibers impregnated with thermosetting resin being wound around the outer periphery of the tank liner,
   wherein the fiber-reinforced resin layer includes an inside layer formed on the tank liner, and an outside layer formed on an outer periphery of the inside layer, wherein the inside layer is formed as a dense layer, while the outside layer is formed as a layer that is less dense than the inside layer and has a large number of airspaces between fibers of the outside layer, and wherein a number of airspaces in the outside layer is larger than in the inside layer.

2. The high pressure gas tank according to claim 1, wherein a thickness of the outside layer is formed thinner than a thickness of the inside layer.

3. The high pressure gas tank according to claim 1, wherein a first winding direction of the inside layer is different than a second winding direction of the outside layer.

4. The high pressure gas tank according to claim 3, wherein the first winding direction is substantially perpendicular to an axis of the tank liner, and the second winding direction is at a slight angle with respect to the axis of the tank liner.

5. The high pressure gas tank according to claim 4, wherein the inside layer is a hoop wound layer, and the outside layer is a helical wound layer.

6. The high pressure gas tank according to claim 1, further comprising gap material interposed between the fibers.

7. The high pressure gas tank according to claim 6, wherein the gap material is formed by glass fiber.

8. The high pressure gas tank according to claim 1, wherein the outside layer has a winding tension lower than a winding tension of the inside layer.

* * * * *